(12) United States Patent
Liao et al.

(10) Patent No.: US 7,876,328 B2
(45) Date of Patent: Jan. 25, 2011

(54) MANAGING MULTIPLE CONTEXTS IN A DECENTRALIZED GRAPHICS PROCESSING UNIT

(75) Inventors: Qunfeng (Fred) Liao, San Jose, CA (US); Yang (Jeff) Jiao, San Jose, CA (US); Yijung Su, Alviso, CA (US)

(73) Assignee: Via Technologies, Inc., Taipei (TW)

( * ) Notice: Subject to any disclaimer, the term of this patent is extended or adjusted under 35 U.S.C. 154(b) by 1008 days.

(21) Appl. No.: 11/672,672

(22) Filed: Feb. 8, 2007

(65) Prior Publication Data

US 2008/0192063 A1 Aug. 14, 2008

(51) Int. Cl.
*G06T 1/00* (2006.01)
*G06T 11/40* (2006.01)
*G06T 15/50* (2006.01)
*G09G 5/00* (2006.01)

(52) U.S. Cl. .................... 345/582; 345/522; 345/552; 345/426

(58) Field of Classification Search ............... 345/522, 345/552, 582, 426
See application file for complete search history.

(56) References Cited

U.S. PATENT DOCUMENTS

| 6,437,788 | B1 | 8/2002 | Milot et al. |
| 7,324,113 | B1 * | 1/2008 | Rouet et al. ............... 345/582 |
| 2003/0001848 | A1 | 1/2003 | Doyle et al. |
| 2003/0058249 | A1 | 3/2003 | Malka et al. |
| 2004/0252126 | A1 | 12/2004 | Margittai et al. |
| 2008/0074433 | A1 * | 3/2008 | Jiao et al. ............... 345/522 |

* cited by examiner

*Primary Examiner*—Hau H Nguyen
(74) *Attorney, Agent, or Firm*—Thomas, Kayden, Horstemeyer & Risley, LLP

(57) ABSTRACT

Provided is a system for managing multiple contexts in a decentralized graphics processing unit. The system includes multiple control units that can include a context buffer, a context processor, and a context scheduler. Also included is logic to receive multiple contexts, logic to identify at least one of the contexts, and logic to facilitate communication among the control units.

12 Claims, 8 Drawing Sheets

MANAGING MULTIPLE CONTEXTS IN A DECENTRALIZED GRAPHICS PROCESSING UNIT

TECHNICAL FIELD

The present disclosure is generally related to computer processing and, more particularly, is related to managing multiple contexts in a decentralized graphics processing unit.

BACKGROUND

Current computer applications are more graphically intense and involve higher degrees of graphics processing power than their predecessors. In addition to applications such as games, which typically involve complex and highly detailed graphics renderings involving a substantial amount of ongoing computations for different types of displayed objects, current applications are also tasked with running multiple applications in a windowed environment. A windowed environment allows a display device to present a graphical output corresponding to multiple applications on a single physical display device. The output is typically displayed in one or more windows, each of which may require a unique context. The context for each of the windows defines the properties and parameters of the window area for that application. Another type of context (e.g., a drawing context) may be related to the object or group of objects that can be rendered using certain textures, surface material types and associated shader programs. In this manner, a context may refer to the data utilized by a graphics system to control the rendering process. For example, the display may include a plurality of overlapping windows, where each window is driven by a different application. Texture and shader data and corresponding state values associated with each window can constitute the contexts for those multiple applications. In the circumstance where the background window is called to the foreground, the context is switched such that the display is updated using the data associated with application of the previously covered window. In a low level context switch, the GPU may finish rendering one type of object and switch to another type that uses a different texture and material set.

A texture context may include a texture base address, sampling rules, type format, etc. A shader context may include similar texture contexts, as well as surface material properties, constants, shader code variations, and/or other shading relevant information. Considering a GPU pipeline very deep with several stages, which may render simultaneously different windows or objects and apply textures from different contexts a centralized system of texture context control may be inoperative without significant performance degradation.

In a typical centralized control scheme, a scheduler can maintain a context buffer and switch tasks in and out of the context buffer. For example, a pixel shader scheduler can keep multiple drawing contexts and dispatch texture service requests based on the demands of the shader program. In the case where texture fetching control is independent of shader control, however, the texture control typically pre-processes texture data before and during the shader program execution. The interactions between the shader scheduler and texture control unit introduces a significant memory and timing overhead and makes a centralized context management scheme inefficient. Decentralizing the context buffers present significant data coordination challenges between the processing stages. Thus, a heretofore-unaddressed need exists in the industry to address the aforementioned deficiencies and inadequacies.

SUMMARY

Embodiments of the present disclosure provide systems and methods for managing multiple contexts in a decentralized graphics processing unit. Briefly described, in architecture, one embodiment of a system, among others, can be implemented as a texture control unit configured to process texture data in a graphics processing unit. The texture control unit comprises a master context scheduler configured to manage context data corresponding to texture processing, and a texture context buffer, configured to store context data utilized by the texture control unit. The system can also include a shader control unit configured to process color and texture data in a graphics processing unit. The shader control unit comprises a slave context scheduler configured to manage context data corresponding to shader processing and a shader context buffer configured to store context data utilized by the shader control unit.

Embodiments of the present disclosure can also be viewed as providing methods for managing multiple contexts in a decentralized graphics processing unit. In this regard, one embodiment of such a method, among others, can be broadly summarized by the following steps: receiving a plurality of contexts, in a sequence, into a first control unit; generating a plurality of context identifiers within a master context scheduler; processing a first portion of the plurality of contexts in the first control unit; receiving (and/or forwarding) context data from the first control unit into a second control unit; receiving context status data, into the first control unit, from the second control unit; and producing context output data from the second control unit.

Embodiments of the present disclosure can also be viewed as providing systems for managing multiple contexts in a decentralized graphics processing unit. Briefly described, one embodiment of a system, among others, can include a plurality of control units, each including a context buffer, a context processor, and a context scheduler. The system can further include logic configured to receive a plurality of contexts, logic configured to identify each of the plurality of contexts, and logic configured to communicate between each of the plurality of control units.

Embodiments of the present disclosure can also be viewed as providing systems for managing multiple contexts in a decentralized graphics processing unit. Briefly described, one embodiment of a system, among others, can be implemented as: a first control unit configured to receive a plurality of contexts having a sequence, wherein the first control unit is further configured to process a first portion of the plurality of contexts; and a second control unit configured to receive a second portion of the plurality of contexts from the first control unit, wherein the second control unit is further configured to communicate a context processing status to the second control unit, and wherein the first control unit is further configured to transmit processed data corresponding to the sequence.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
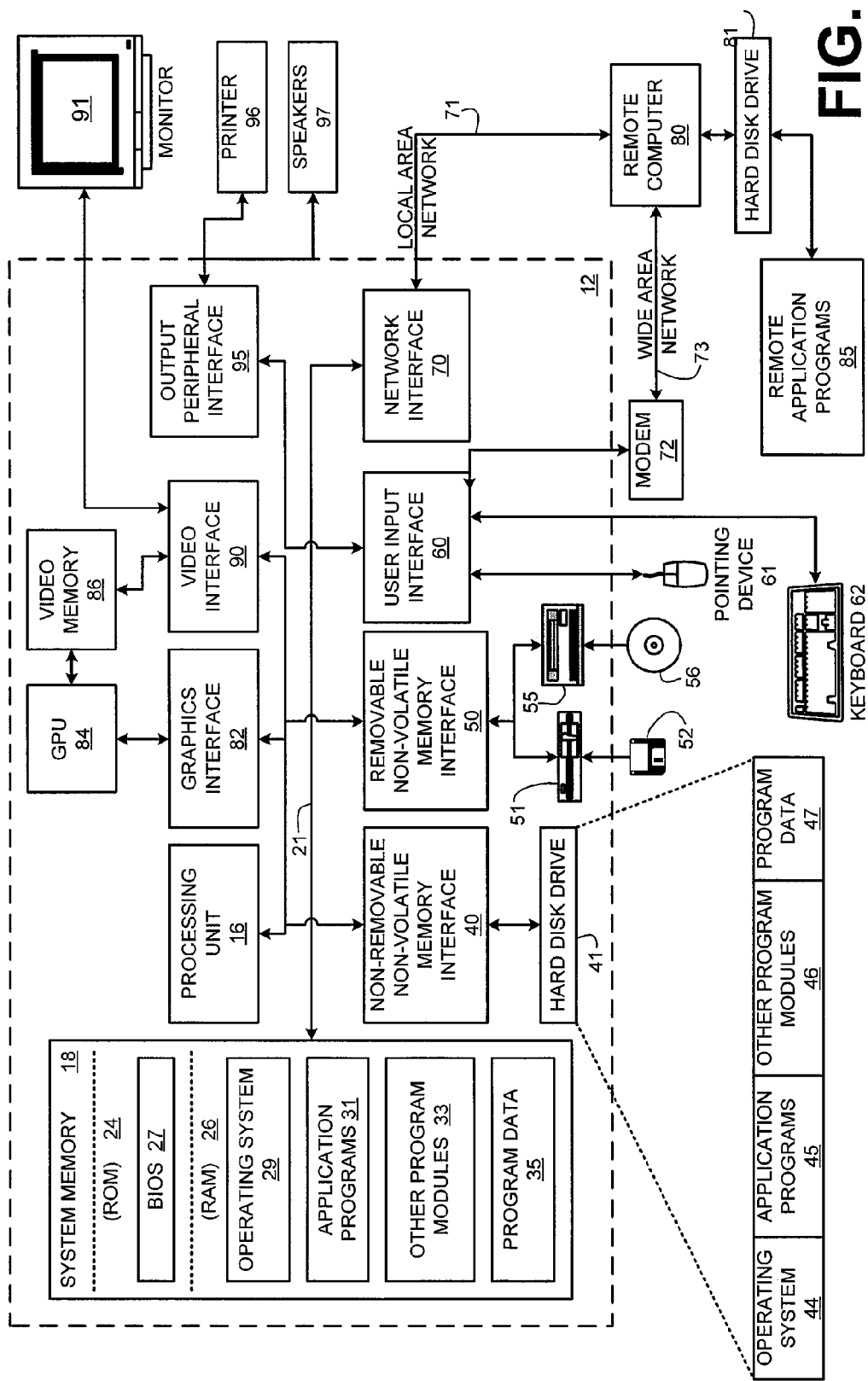
FIG. 1 is a diagram illustrating an exemplary non-limiting computing device in which managing multiple contexts in a decentralized graphics computing environment can be implemented.

Having summarized various aspects of the present disclosure, reference will now be made in detail to the description of the disclosure as illustrated in the drawings. While the disclosure will be described in connection with these drawings, there is no intent to limit it to the embodiment or embodiments disclosed herein. On the contrary, the intent is to cover all alternatives, modifications and equivalents included within the spirit and scope of the disclosure as defined by the appended claims.

Referring to FIG. 1, an exemplary non-limiting computing device is shown which has a graphics display output that may utilize features disclosed herein. FIG. 1 and the following discussion are intended to provide a brief general description of a computing environment in connection with the disclosure herein. It should be understood, however, that handheld, portable, and other computing devices and computer objects of all kinds may be utilized in association with this disclosure as well. Consequently, while a general purpose computer is described herein, it is but one non-limiting example, and this disclosure may be implemented in a plurality of additional applications, as one of ordinary skill in the art would understand. As an additional non-limiting example, anywhere that data may be stored or from which data may be retrieved or transmitted to another computer is a desirable, or suitable, environment for operation of the techniques, as disclosed herein.

This disclosure may be implemented by an operating system as a non-limiting example, for use by a developer of services of a device or object, and/or included within application software that operates in connection with the techniques described herein. Software may be described or represented in the general context of computer executable instructions, such as program modules, being executed by one or more computers, such as client workstations, servers, or other devices. Program modules may include routines, programs, objects, components, data structures, and the like that perform a particular task or implement particular abstract data types, as one of ordinary skill in the art would understand. The functionality of program modules may be combined or distributed as desired in various configurations.

Other computing systems, environments, and/or configurations that may be suitable for use with this disclosure include, but are not limited to, personal computers (PCs), automated teller machines (ATMs), server computers, handheld or laptop devices, multiprocessor systems, microprocessor based systems, programmable consumer electronics, network PCs, environmental control elements, minicomputers, mainframe computers, and the like. This disclosure may be applied and distributed in computing environments where tasks are performed by remote processing devices that are coupled via communication networks/buses or another data transmission medium. In a distributed computing environment, program modules may be located in both local and remote computer storage media, including memory storage devices, and client nodes may in turn behave as server nodes.

The computing system 10 of FIG. 1 includes a computer 12. The components of the computer 12 may include, as non-limiting examples, a processing unit 16, a system memory 18, and a system bus 21 that couples various system components, including the system memory 18, to the processing unit 16. The system bus 21 may be any of several types of bus structures, as one of ordinary skill in the art would understand, including a memory bus or memory controller, a peripheral bus, and a local bus using any of a variety of bus architectures. As a non-limiting example, such architectures may include a peripheral component interconnect (PCI) bus, accelerated graphics port (AGP), and/or PCI Express bus.

Computer 12 may include a variety of computer readable media. Computer readable media can be any available media that can be accessed by computer 12 and includes both volatile and nonvolatile memory, removable and non-removable memory. As a non-limiting example, computer readable media may comprise computer storage media and communication media. Computer storage media may include both volatile and nonvolatile, removable and non-removable media implemented in any method or technology for storage such as computer readable instructions, data structures, program modules, or other data, as one of ordinary skill in the art would understand. Computer storage media includes, as non-limiting examples, RAM, ROM, EEPROM, flash memory, or other memory technology, CDROM, digital versatile disks (DVD) or other optical disk storage disks, magnetic cassettes, magnetic tape, magnetic disk storage, or other magnetic storage devices, or any other medium that can be used to store desired information and which can be accessed by computer 12.

The system memory 18 may include computer storage media in the form of volatile and/or nonvolatile memory, such as read only memory (ROM) 24 and random access memory (RAM) 26. A basic input/output system 27 (BIOS), containing the basic routines that may help to transfer information between elements within computer 12, such as during startup, may be stored in ROM 24. RAM 26 may contain data and/or program modules that are accessible to and/or presently being operated on by processing unit 16. As a non-limiting example, operating system 29, application programs 31, other program modules 33, and program data 35 may be contained in RAM 26.

Computer 12 may also include other removable/non-removable volatile/nonvolatile computer storage media. As a non-limiting example, a hard drive 41 may read from or write to non-removable, nonvolatile magnetic media. A magnetic disk drive 51 may read from or write to a removable, nonvolatile magnetic disk 52. An optical disk drive 55 may read from or write to a removable, nonvolatile optical disk 56, such as a CDROM or other optical media. Other removable/non-removable volatile/nonvolatile computer storage media that can be used in the exemplary computing system 10 include, but are not limited to, magnetic tape cassettes, flash memory cards, DVDs, digital video tape, solid state RAM, solid state ROM, and the like.

Hard disk drive 41 may typically be connected to bus system 21 through a nonvolatile memory interface such as interface 40. Likewise, magnetic disk drive 51 and optical disk drive 55 may be connected to bus system 21 by removable memory interface, such as interface 50. The drives and their associated computer storage media described above and shown in FIG. 1 may provide storage of computer readable instructions, data structures, program modules, and other data for computer 12. As a non-limiting example, hard disk drive 41 is illustrated as storing operating system 44, application programs 45, other program modules 46, and program data 47. These components may either be the same as or different from operating system 29, application programs 31, other program modules 33, and/or program data 35. As illustrated in the nonlimiting example of FIG. 1, the components of software are given separate reference numerals to at least illustrate that they are distinct copies.

A user may enter commands and information into computer 12 through input devices such as keyboard 62 and pointing device 61. These devices are but non-limiting examples, as one of ordinary skill in the art would understand. Keyboard 62 and pointing device 61, however, may be coupled to processing unit 16 through a user input interface 60 that is coupled to system bus 21. However, one of ordinary skill in the art would understand that other interface and bus structures such as a parallel port, game port, or a universal serial bus (USB) may also be utilized for coupling these devices to the computer 12.

A graphics interface 82 may also be coupled to the system bus 21. As a non-limiting example, the graphics interface 82 may be configured as a chip set that communicates with the processing unit 16, and assumes responsibility for accelerated graphics port (AGP) or PCI-Express communications. One or more graphics processing units (GPUs) 84 may communicate with the graphics interface 82. As a non-limiting example, GPU 84 may include on-chip memory storage, such as register storage and cache memory. GPU 84 may also communicate with a video memory 86, wherein application variables, as disclosed herein may have impact. GPU 84, however, is but one non-limiting example of a coprocessor, and thus a variety of co-processing devices may be included with computer 12.

A monitor 91 or other type of display device may be also coupled to system bus 21 via video interface 90, which may also communicate with video memory 86. In addition to monitor 91, computer system 10 may also include other peripheral output devices, such as printer 96 and speakers 97, which may be coupled via output peripheral interface 95.

One of ordinary skill in the art would understand that computer 12 may operate in a networked or distributed environment using logical connections to one or more remote computers, such as remote computer 80. Remote computer 80 may be a personal computer, a server, a router, a network PC, a pier device, or other common network node. Remote computer 80 may also include many or all of the elements described above in regard to computer 12, even though only memory storage device 81 and remote application programs 85 are depicted in FIG. 1. The logical connections depicted in FIG. 1 include a local area network (LAN) 71 and a wide area network (WAN) 73, but may include other network/buses, as one of ordinary skill in the art would understand.

In the non-limiting example of FIG. 1, remote computer 80 may be coupled to computer 12 via LAN connection 71 and network interface 70. Likewise, a modem 72 may be used to couple computer 12 (via user input interface 60) to remote computer 80 across WAN connection 73.

Figure 2:
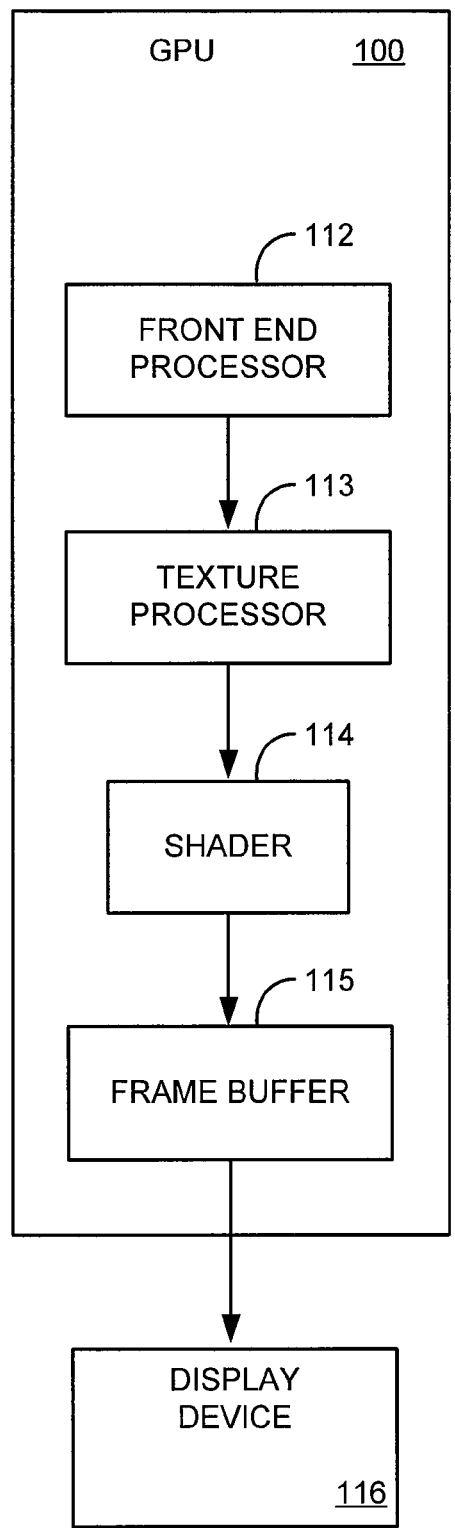
FIG. 2 is a block diagram illustrating an exemplary non-limiting graphics processing unit (GPU) in which managing multiple contexts in a decentralized graphics computing environment can be implemented.

Brief reference is now made to FIG. 2, which is a block diagram illustrating an exemplary non-limiting graphics processing unit in which managing multiple contexts in a decentralized graphics computing environment can be implemented. As discussed above, in reference to FIG. 1, graphics requests from a CPU are received by the graphics processing unit 100 and provided to a front end processor 112. The front end processor 112 may include a vertex shader, geometry shader and rasterizer that can be configured to generate a pixel stream containing pixel coordinates corresponding to the display device 116.

Information relating to the pixel coordinates generated by the front end processor 112 is provided to a texture processor 113. The texture processor 113 processes information relating to, for example, texture maps or texture samples and the corresponding texture filtering functions. The texture processor 113 ultimately generates texture data for each pixel. The information relating to the pixel coordinates is also passed down to the shader 114, which generates final color component values including, but not limited to, r, g, b, and α values and may initiate another texture fetch, based on calculations in the shader program. The texture data and the color data are the operands for the final color data calculations result that is sent to the frame buffer 115, which is used to generate and display data for the display device 116.

Figure 3:
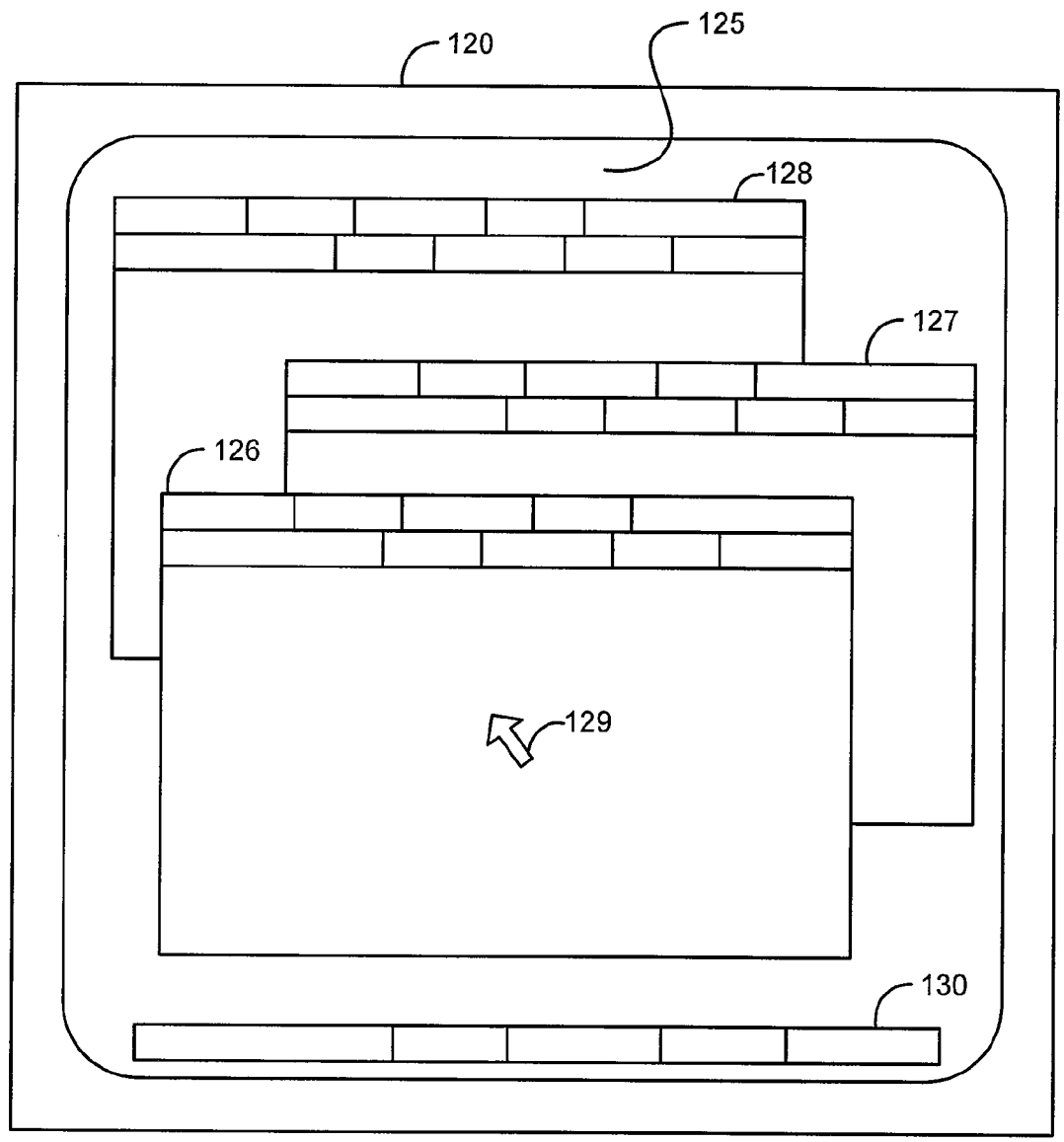
FIG. 3 is an enlarged view of an exemplary non-limiting video display in which managing multiple contexts in a decentralized graphics computing environment can be implemented.

Reference is now made to FIG. 3, which is an enlarged view of an exemplary non-limiting video display in which managing multiple contexts in a decentralized graphics computing environment can be implemented. The display 125 has a screen that may render a plurality of windows 126, 127, and 128 for different processes and/or applications that are running at a given time on the computing device. Additionally, the display can include a cursor 129 and other control buttons or bars 130 on the background of the screen, usually for representing operating system information or the like. Some of the windows can be utilized for 2-dimensional renderings while others can be utilized for 3-dimensional renderings. The background, the cursor 129, and each of the three windows 126, 127, and 128 can be considered to include different contexts. As the screen output is modified, rapid and frequent context changes are required to support these changes. For example, where an application corresponding to a first window 128 is brought to the foreground, the context associated with the first window 128 can replace covered portions of the other windows 126, 127.

Figure 4:
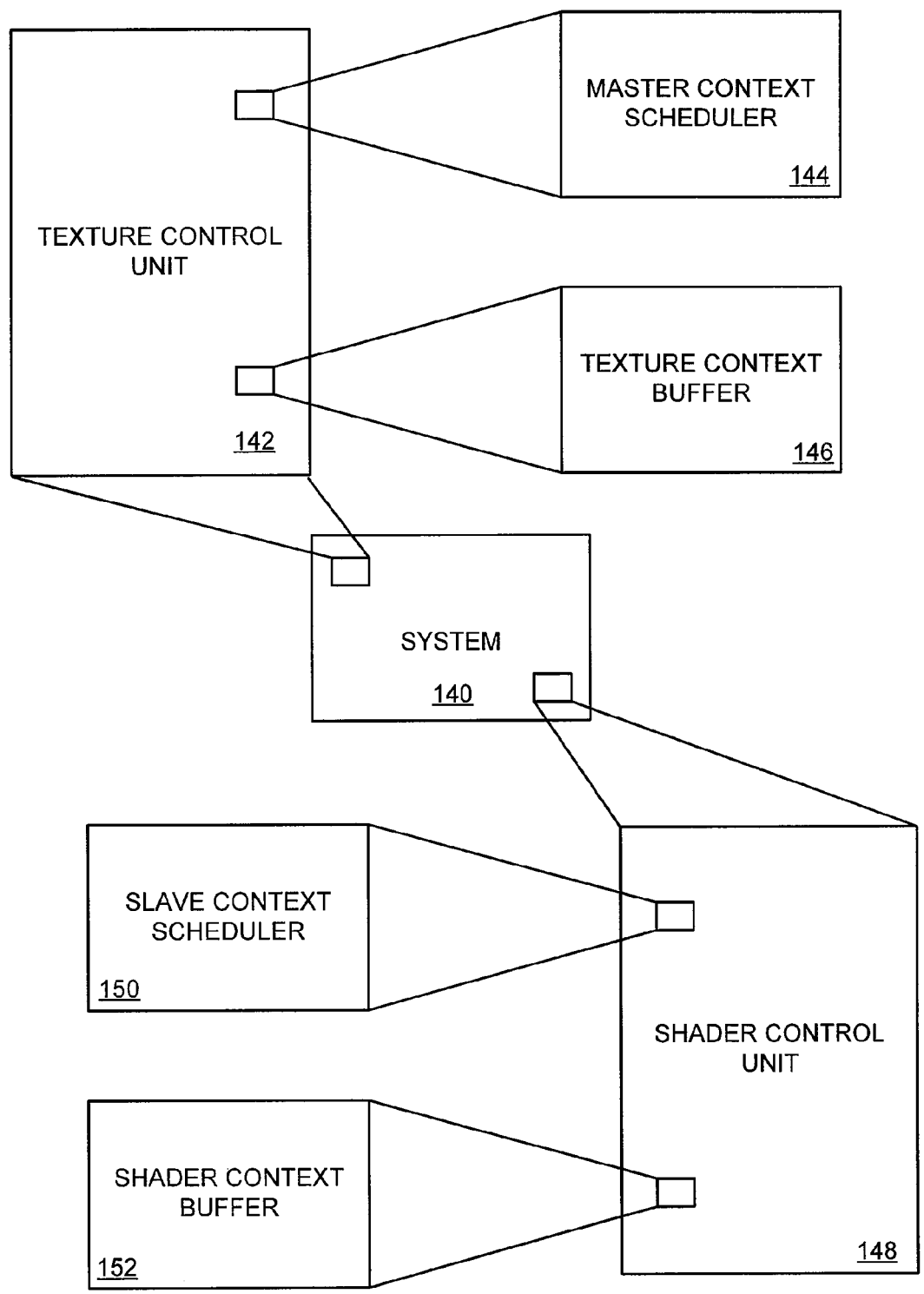
FIG. 4 is a block diagram illustrating an exemplary embodiment of a system for managing multiple contexts in a decentralized graphics computing environment.

Reference is now made to FIG. 4, which is a block diagram illustrating an exemplary embodiment of a system for managing multiple contexts in a decentralized graphics computing environment. The system 140 includes a texture control unit 142 and a shader control unit 148. As discussed above, in reference to FIG. 2, the texture processor and shader processors are stages that may be utilized in a graphics pipeline. Within the texture control unit 142 is a master context scheduler 144, which takes a sequence of multiple contexts and assigns a unique identifier, known as a context identifier, to each of the contexts. Also included in the texture control unit 142 is a texture context buffer 146. The texture context buffer 146 is utilized to store texture context data associated with the sequence of contexts received and can be addressed by the context identifier. The contexts can, for example, be associated with different applications that are actively displayed or with different classes of objects to be rendered in one application. In some circumstances these may be windowed applications, where one window is placed in the foreground and the remaining windows can be partially or fully obscured by the window in the foreground. Similarly, the applications may be active but maximized where only one application is displayed at a time but other applications are active and should be available to replace the existing display.

The master context scheduler 144 may limit the number of contexts received by the texture control unit 142 based on the capacity of the texture context buffer 146. The shader control unit 148 includes a slave context scheduler 150 and a shader context buffer 152. The slave context scheduler 150 can limit the number of shader contexts received based on the capacity of the shader context buffer 152. The slave context scheduler 150 manages the shader context data within the shader control unit by accepting the context identifier assigned by the master context scheduler 144. As the system 140 processes each of the multiple contexts, the common context identifier is utilized to coordinate the context processing in both the texture and shader stages simultaneously. Further, when the shader control unit 148 is finished with the processing for a given context, the texture control unit 142 is notified so that the data stored for that specific context can be written over by subsequent context data.

Figure 5:
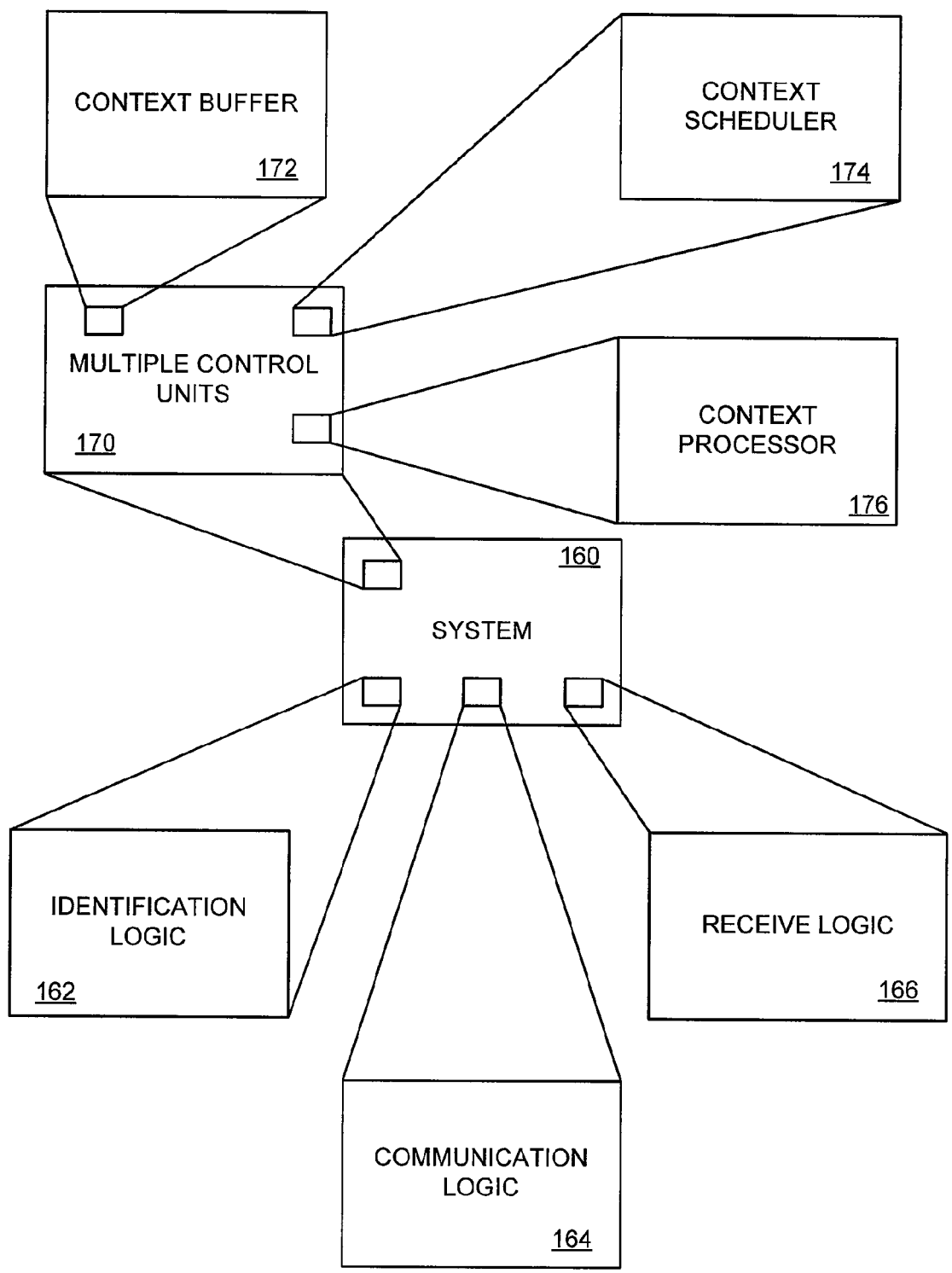
FIG. 5 is a block diagram illustrating an alternative embodiment of a system for managing multiple contexts in a decentralized graphics computing environment.

Reference is now made to FIG. 5, which is a block diagram illustrating an alternative embodiment of a system for managing a plurality of contexts in a decentralized graphics computing environment. The system 160 includes multiple control units 170 each containing a context buffer 172, a context scheduler 174, and a context processor 176. Multiple control units 170 can be long, for example, to independent processing stages within a graphics pipeline, as well as multiple parallel shader processors. Further, while each of the multiple control units 170 may include a context scheduler 174, one or more of the multiple control units 170 will include a context scheduler 174, configured as a master.

The system 160 includes identification logic 162 configured to assign a unique identifier for each of the multiple contexts received in the multiple control units 170. The unique identifier allows multiple contexts to be processed within more than one of the control units 170 simultaneously. The system 160 also includes receive logic 166 configured to receive an amount of multiple contexts that is consistent with the capacity of the context buffers 172. The receive logic 166 can also be utilized to generate buffer capacity related signals for use by the communication logic 164. The receive logic 166 basically duplicates the communication logic 164. The system 160 further includes communication logic 164 configured to provide communication between the multiple control units 170. The communication logic 164 includes, for example, dependent read functions to allow for iterative processing. The communication logic 164 can also be utilized to provide capacity feedback between the multiple control units 170 to provide a variety of status signals regarding the processing of contexts within the system.

Figure 6:
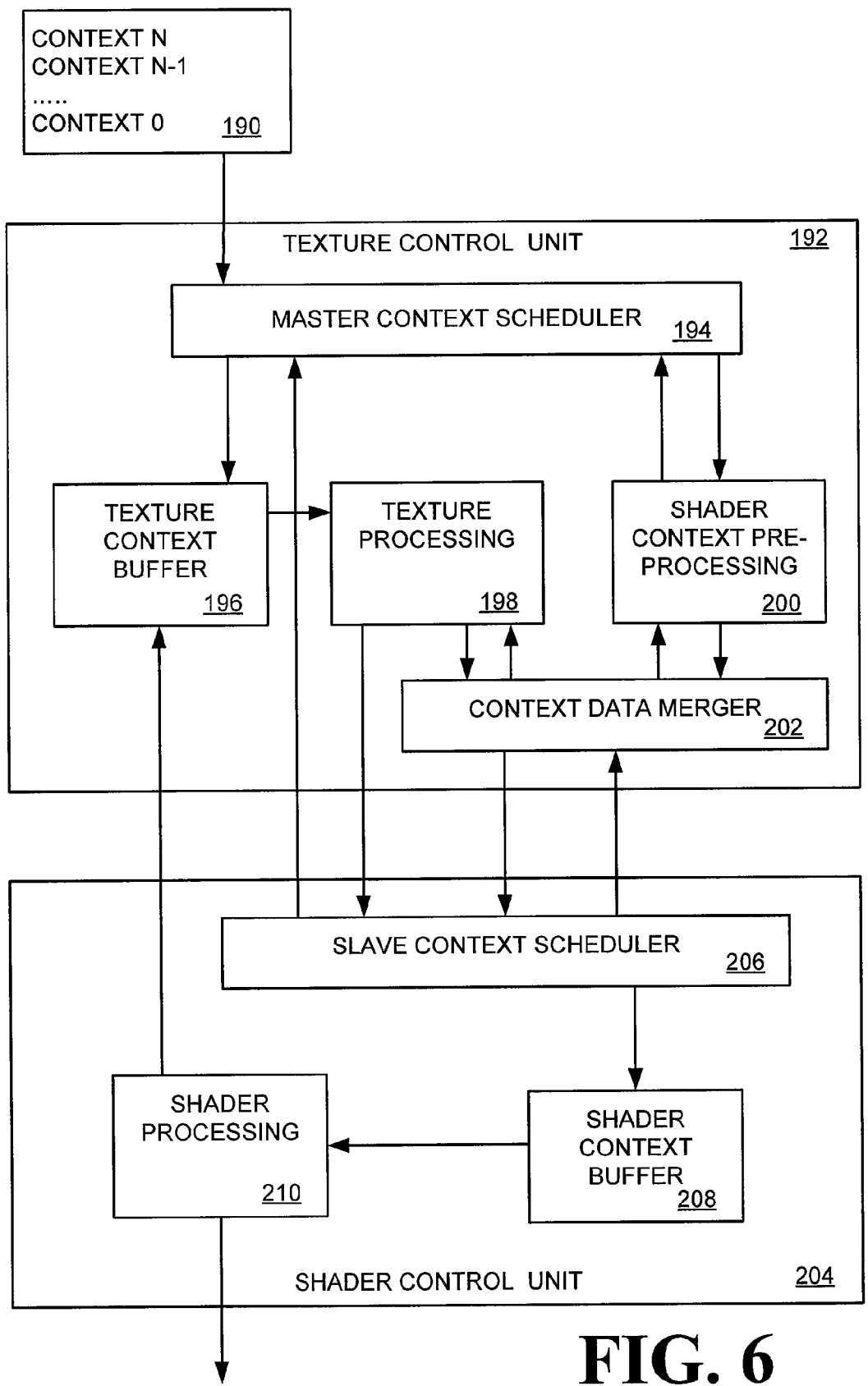
FIG. 6 is a block diagram illustrating an alternative embodiment of a system for managing multiple contexts in a decentralized graphics computing environment.

Reference is now made to FIG. 6, which is a block diagram illustrating an alternative embodiment of the system for managing multiple contexts in a decentralized graphics computing environment. The system includes a texture control unit 192 that further includes a master context scheduler 194. The master context scheduler 194 is configured to receive a sequence of multiple contexts 190. The master context schedule 194 assigns a context identifier to each of the multiple contexts and stores the context data in a texture context buffer 196. The master context scheduler 194 is configured to limit the number of contexts received based on the capacity of the texture context buffer 196. A texture processing block 198 receives texture context data from the texture context buffer 196 and processes the texture context data corresponding to the multiple contexts 190.

The master context scheduler 194 also sends context data relating to shader processing to a shader context preprocessing block 200. Some of the context data may be consumed within the shader context preprocessing block 200 while other of the context data will be merged with data from the texture processing stage 198 in a context data merger block 202. The combined data will then be sent to a slave context scheduler 206 within the shader control unit 204. The shader context data is sent from the slave context scheduler 206 to the shader context buffer 208 for storage and subsequent access by the shader processing block 210. Where the slave context scheduler 206 determines that the shader context buffer 208 lacks additional capacity for receiving additional contexts, a back pressure signal can be sent to the texture control unit 192 to indicate a refusal to accept any additional context data. Similarly, where the slave context scheduler 206 determines that a particular context has been fully processed, a free signal can be sent to the master context scheduler 194 indicating to free the old contexts. In this manner, the texture control unit 192 resources can be made available to receive additional contexts for processing. The shader processing block 210 can request additional data from the texture context buffer 196 for subsequent processing steps. A processing loop between the shader control unit 204 and the texture control unit 192 operates on multiple concurrent drawing contexts based on the unique context identifiers. When one of the sequence of multiple contexts has been processed, the context is outputted by the shader control unit 204 in the same sequence, relative to the other contexts, that it was received by the texture control unit 192.

Figure 7:
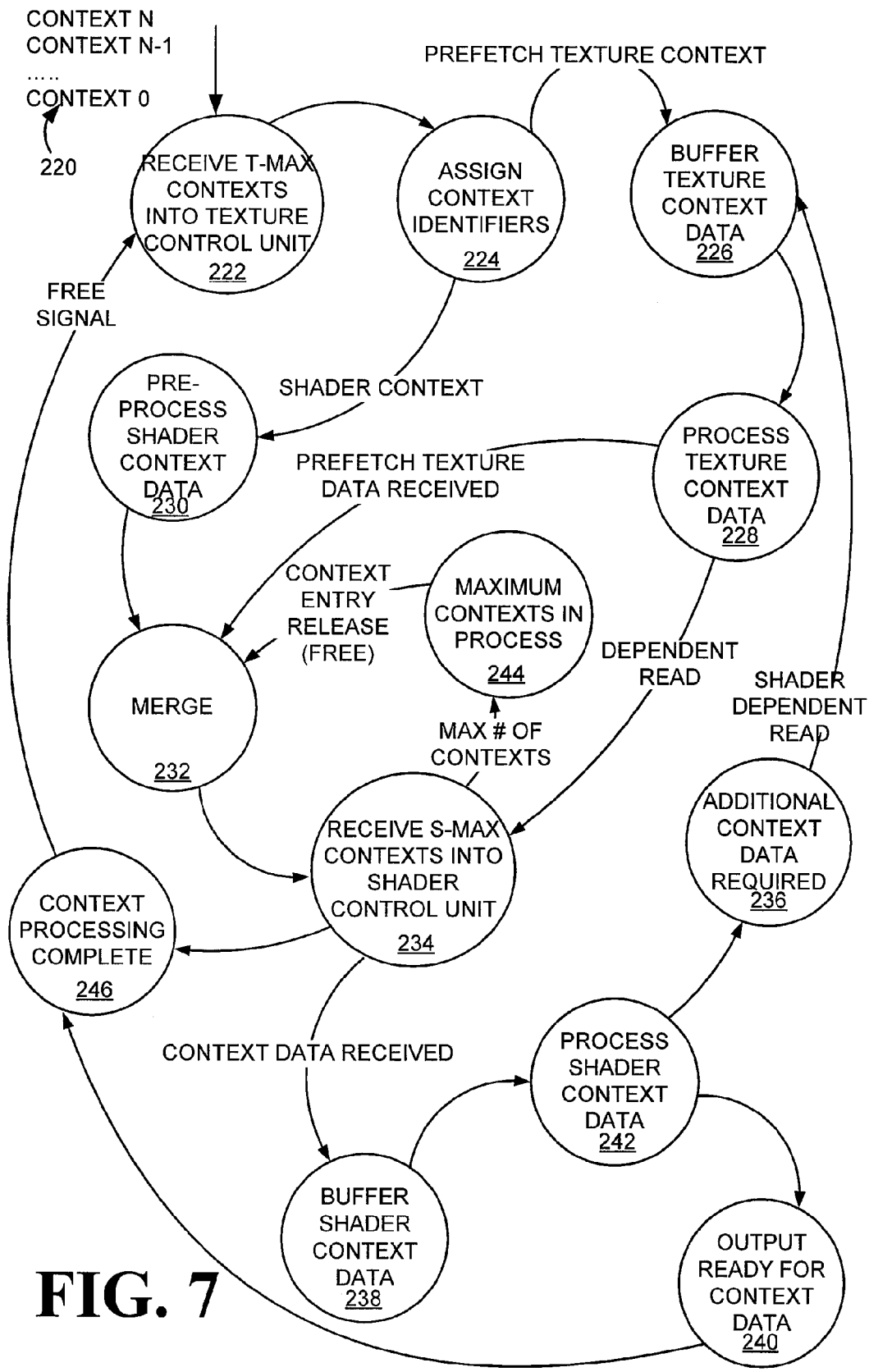
FIG. 7 is a flow diagram illustrating an embodiment of data flow and control signals in a system for managing multiple contexts in a decentralized graphics computing environment.

Reference is now made to FIG. 7, which is a flow diagram illustrating an embodiment of data flow and control signals in a system for managing multiple contexts in a decentralized graphics computing environment. A sequence of multiple contexts 220 is received into a texture control unit in 222. A maximum number of contexts received is determined by the texture control unit based on the capacity of a texture context data buffer. After receiving the multiple contexts, context identifiers are assigned in 224. If the multiple contexts include a pre-fetch texture context, one or more of the contexts may be buffered in 226. Additionally, where the multiple contexts includes a shader context, context data related to shader processing is preprocessed in 230. While the shader context data is preprocessed in 230, texture context data can be being processed in 228. Results of the processed texture context data and the preprocessed shader context data are merged in 232. The shader context data that results from the merge is received into the shader control unit 234 and then buffered in 238. If the shader control unit determines that the maximum number of contexts have been received or are in process, a back pressure signal is issued to indicate that the shader control unit will no longer received additional merged data 244.

When processing of a particular context is complete in 246, a free signal is sent to the texture control unit to indicate that all the data corresponding to that context can be trashed, thereby freeing the texture control unit to receive and process additional contexts. Shader context data is processed in 242, and where additional context data are required (circle 236), a read operation is performed from the texture context buffer. In this manner, when the shader control unit accepts a context and begins to process the context, the shader control unit can request and retrieve additional requisite texture context data using the same texture contexts pointed to by the context identifier in multiple iterative loops. When the shader context processing is complete, the context data is output in 240 in the same sequence that the multiple context 220 were received.

Figure 8:
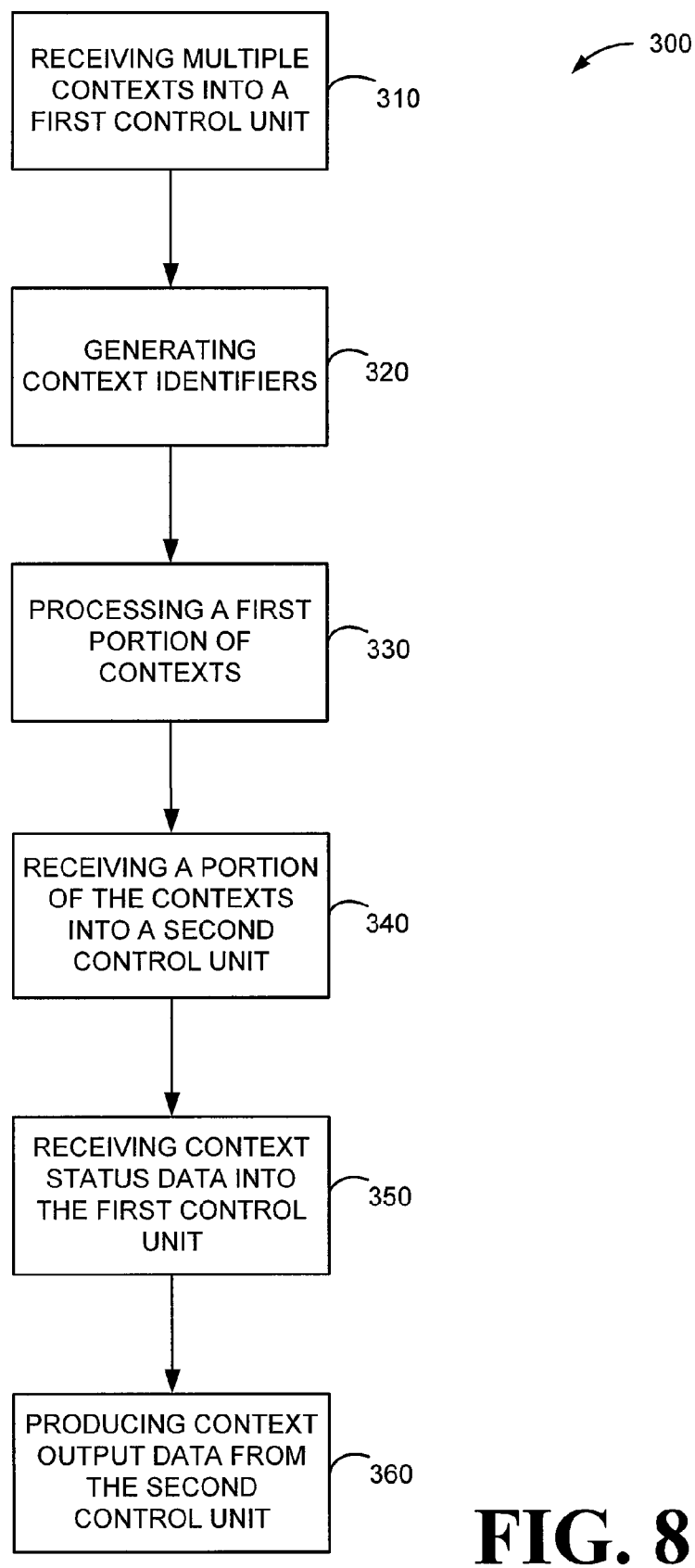
FIG. 8 is a block diagram illustrating an embodiment of a method for managing multiple contexts in a decentralized graphics computing environment.

Reference is now made to FIG. 8, which is a block diagram illustrating an embodiment of a method for managing multiple contexts in a decentralized graphics computing environment. The method begins with receiving multiple contexts into a first control unit in block 310. Contexts correspond to specific drawings and can contain texture context, shader context, and other transient context data. The first control unit can be any of a number of pipeline processing stages in a graphics processing unit. Unique context identifiers are generated for one or more of the contexts in block 320. The context identifiers are generated from the master control, which is in the first control unit and will be utilized for the same context as the context is processed through multiple control units. The context identifier ensures that the same context data is loaded, stored, and processed for the active context.

A first portion of the context data is processed in block 330. This processing is performed within the first control unit where the portion of the contexts processed corresponds to a specific functionality of that first control unit. For example, context data corresponding to pre-fetched texture functions would be processed in the first control unit where the first control unit is a texture control unit. The texture control unit can include, but is not limited to, a texture address generator, a texture cache control logic, and a texture filter unit. A second portion of the context data is received in a second control unit in block 340. The second portion corresponds to the specific functionality of the second control unit. For example, where the second control unit performs shader related calculations, the second portion of the context data will correspond to shader functions. Examples of shader related data includes, but is not limited to, r, g, b, and α values. Shader functions may include a texture dependent read, as well.

The first control unit receives context status data in block 350. The context status data can include, for example, an indication that the second control unit has completed processing of a particular context and therefore the resources dedicated to that particular context data can be made available for subsequent contexts to be received. Additionally, context status data can include an indication that the second control unit has no additional capacity for more contexts and thus will not receive additional contexts until processing on at least one of the presently stored contexts is completed. In this manner, the second control unit realizes efficient utilization by receiving additional data when the shader buffer capacity is available. Further, the context status data can include a request for additional context data to be utilized in, for example, a processing loop for iterative calculations or processing. Context output data is produced from the second control unit in block 360. The context output data is output in the same sequence that the multiple contexts were received into the first control unit.

Embodiments of the present disclosure can be implemented in hardware, software, firmware, or a combination thereof. Some embodiments can be implemented in software or firmware that is stored in a memory and that is executed by a suitable instruction execution system. If implemented in hardware, an alternative embodiment can be implemented with any or a combination of the following technologies: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Any process descriptions or blocks in flow charts should be understood as representing modules, segments, or portions of code which include one or more executable instructions for implementing specific logical functions or steps in the process, and alternate implementations are included within the scope of an embodiment of the present disclosure in which functions may be executed out of order from that shown or discussed, including substantially concurrently or in reverse order, depending on the functionality involved as would be understood by those reasonably skilled in the art of the present disclosure.

It should be emphasized that the above-described embodiments of the present disclosure, particularly, any illustrated embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

At least the following is claimed:

1. A system for managing multiple contexts in a decentralized graphics processing unit, comprising:
   a texture control unit configured to process texture data in the graphics processing unit, the texture control unit comprising
   a master context scheduler configured to manage context data corresponding to texture processing, and
   a texture context buffer, configured to store context data utilized by the texture control unit; and
   a shader control unit configured to process color data in the graphics processing unit, the shader control unit comprising:
   a slave context scheduler configured to manage context data corresponding to shader processing; and
   a shader context buffer configured to store context data utilized by the shader control unit.

2. The system of claim 1, wherein the texture context buffer and the shader context buffer are each configured to store the context data corresponding to a plurality of contexts.

3. The system of claim 2, wherein the texture control unit assigns a unique context identifier to each of the plurality of contexts.

4. The system of claim 1, wherein the shader control unit is configured to receive a context identifier from the texture control unit corresponding to one of the plurality of contexts.

5. The system of claim 1, wherein the texture control unit comprises a shader context preprocessor configured to receive the portion of context data.

6. The system of claim 1 wherein the texture control unit further comprises a context data merger block configured to merge texture context data with shader context data.

7. The system of claim 1, wherein the master context scheduler manages up to a first quantity of contexts and the slave context scheduler manages up to a second quantity of contexts; and the first quantity is greater or equal than the second quantity.

8. The system of claim 1, wherein the slave context scheduler transmits a back pressure signal to the texture control unit to indicate that the shader control unit will not receive additional contexts from the texture control unit.

9. The system of claim 1, wherein the slave context scheduler transmits a free signal to the master context scheduler to indicate that a context has been processed.

10. The system of claim 1, wherein the context data comprises:
    texture context data; and
    shader context data.

11. The system of claim 1, wherein the texture control unit further comprises texture processing logic configured to process texture data.

12. The system of claim 1, wherein the shader control unit further comprises shader processing logic configured to process shader data.

\* \* \* \* \*